United States Patent
Mathur et al.

(10) Patent No.: US 9,582,499 B2
(45) Date of Patent: Feb. 28, 2017

(54) RETRIEVAL OF DOMAIN RELEVANT PHRASE TABLES

(71) Applicant: Xerox Corporation, Norwalk, CT (US)

(72) Inventors: Prashant Mathur, Trento (IT); Sriram Venkatapathy, Grenoble (FR); Nicola Cancedda, London (GB)

(73) Assignee: XEROX CORPORATION, Norwalk, CT (US)

( * ) Notice: Subject to any disclaimer, the term of this patent is extended or adjusted under 35 U.S.C. 154(b) by 348 days.

(21) Appl. No.: 14/252,194

(22) Filed: Apr. 14, 2014

(65) Prior Publication Data
US 2015/0293910 A1    Oct. 15, 2015

(51) Int. Cl.
G06F 17/28    (2006.01)
G06F 17/30    (2006.01)

(52) U.S. Cl.
CPC ..... *G06F 17/2818* (2013.01); *G06F 17/30684* (2013.01)

(58) Field of Classification Search
CPC .................................................. G06F 17/2809
See application file for complete search history.

(56) References Cited

U.S. PATENT DOCUMENTS

| | | |
|---|---|---|
| 6,182,026 B1 | 1/2001 | Tillman et al. |
| 6,917,936 B2 | 7/2005 | Cancedda |
| 8,543,563 B1 | 9/2013 | Nikoulina et al. |
| 2004/0024581 A1 | 2/2004 | Koehn et al. |
| 2004/0030551 A1 | 2/2004 | Marcu et al. |
| 2005/0137854 A1 | 6/2005 | Cancedda et al. |
| 2006/0190241 A1 | 8/2006 | Goutte et al. |
| 2007/0150257 A1 | 6/2007 | Cancedda et al. |
| 2007/0265825 A1 | 11/2007 | Cancedda et al. |
| 2008/0262826 A1 | 10/2008 | Pacull |
| 2008/0300857 A1 | 12/2008 | Barbaiani et al. |
| 2009/0175545 A1 | 7/2009 | Cancedda et al. |
| 2009/0177460 A1* | 7/2009 | Huang ................ G06F 17/2818 704/2 |
| 2009/0248394 A1* | 10/2009 | Sarikaya ............. G06F 17/2818 704/4 |
| 2010/0268527 A1 | 10/2010 | Tomeh et al. |
| 2011/0022380 A1 | 1/2011 | Zaslavskiy et al. |
| 2011/0178791 A1 | 7/2011 | Stymne et al. |

(Continued)

OTHER PUBLICATIONS

Cui, Jia, Yonggang Deng, and Bowen Zhou. "Reinforcing language model for speech translation with auxiliary data." Automatic Speech Recognition & Understanding, 2009. ASRU 2009. IEEE Workshop on. IEEE, 2009.*

(Continued)

*Primary Examiner* — Brian Albertalli
(74) *Attorney, Agent, or Firm* — Fay Sharpe LLP

(57) ABSTRACT

A method for generating a phrase table for a target domain includes receiving a source corpus for a target domain and, for each of a set of comparative domain phrase tables, computing a measure of similarity between the source corpus and the comparative domain phrase table. Based on the computed similarity measures, a subset of the comparative domain phrase tables may be identified from the set of comparative domain phrase tables, and/or weights for combining them, and a phrase table is generated for the target domain based on the at least a subset of phrase tables.

20 Claims, 8 Drawing Sheets

(56) References Cited

U.S. PATENT DOCUMENTS

| | | | |
|---|---|---|---|
| 2011/0282643 A1 | 11/2011 | Chatterjee et al. | |
| 2011/0288852 A1 | 11/2011 | Dymetman et al. | |
| 2011/0307245 A1 | 12/2011 | Hanneman et al. | |
| 2012/0041753 A1 | 2/2012 | Dymetman | |
| 2012/0101804 A1 | 4/2012 | Roth et al. | |
| 2012/0259807 A1 | 10/2012 | Dymetman | |
| 2012/0278060 A1 | 11/2012 | Cancedda et al. | |
| 2012/0316862 A1* | 12/2012 | Sultan | G06F 17/2755 704/4 |
| 2013/0006954 A1 | 1/2013 | Nikoulina et al. | |
| 2013/0117010 A1* | 5/2013 | Hwang | G06F 17/2818 704/2 |
| 2013/0173255 A1* | 7/2013 | Ehsani | G10L 15/193 704/9 |
| 2014/0149102 A1* | 5/2014 | Marcu | G06F 17/2854 704/2 |
| 2015/0106076 A1* | 4/2015 | Hieber | G06F 17/2854 704/2 |

OTHER PUBLICATIONS

Haghighi, Aria, Percy Liang, Taylor Berg-Kirkpatrick, and Dan Klein. "Learning Bilingual Lexicons from Monolingual Corpora." In ACL, vol. 2008, pp. 771-779. 2008.*

Daumé III, Hal, and Jagadeesh Jagarlamudi. "Domain adaptation for machine translation by mining unseen words." Proceedings of the 49th Annual Meeting of the Association for Computational Linguistics: Human Language Technologies: short papers—vol. 2. Association for Computational Linguistics, 2011.*

Axelrod, Amittai, et al., "Domain adaptation via pseudo in-domain data selection," Proc. Conf. on Empirical Methods in Natural Language Processing, EMNLP '11, pp. 355-362 (2011).

Banerjee, Pratyush, et., al. "Combining multi-domain statistical machine translation models using automatic classifiers", Proc.$9^{th}$ Conf. of the Assoc. for Machine Translation in the Americas, pp. 1-10 (2010).

Bertoldi, et al., "Domain adaptation for statistical machine translation with monolingual resources," Proceedings of the Fourth Workshop on Statistical Machine Translation, StatMT '09, pp. 182-189, Stroudsburg, PA, USA. Association for Computational Linguistics. (2009).

Bisazza, Arianna, et al., "Fill-up versus Interpolation Methods for Phrase-based SMT Adaptation," Intern'l Workshop on Spoken Language Translation (IWSLT), pp. 136-143 (2011).

Bojar, Ondřej, et al., "Findings of the 2013 Workshop on Statistical Machine Translation," Proc. 8th Workshop on Statistical Machine Translation, ACL, pp. 1-44 (Aug. 2013).

Cancedda, Nicola "Private access to phrase tables for statistical machine translation," ACL (2), pp. 23-27 (2012).

Caruana, Rich, "Multitask learning," Mach. Learn., 28(1) pp. 41-75 (1997).

Cettolo, Mauro, et al., "Wit3: Web inventory of transcribed and translated talks," Proc. 16th Conf. of the European Assoc. for Machine Translation (EAMT), pp. 261-268 (May 2012).

Chen, Stanley F., et al., "An empirical study of smoothing techniques for language modeling," Computer Speech and Language, 4(13):359-393 (1999).

Cherry, Colin, et al., "Batch tuning strategies for statistical machine translation," Proc.2012 Conf. of the North American Chapter of the Association for Computational Linguistics: Human Language Technologies, ACL, pp. 427-436 (Jun. 2012).

Civera, Jorge, et al., "Domain adaptation in statistical machine translation with mixture modelling," Proc. 2nd Workshop on Statistical Machine Translation, pp. 177-180 (2007).

Duan, Nan, et al., "Mixture model-based minimum Bayes risk decoding using multiple machine translation systems," Proc.23rd Intern'l Conf. on Computational Linguistics, pp. 313-321 (2010).

Foster, George, et al., "Mixture-model adaptation for SMT," Proc. $2^{nd}$ Workshop on Statistical Machine Translation, StatMT '07, pp. 128-135 (2007).

Gao, Qin, et al., "Parallel implementations of word alignment tool," Software Engineering, Testing, and Quality Assurance for Natural Language Processing, SETQA-NLP '08, ACL, pp. 49-57 (2008).

Hasler, Eva, et al, "Margin Infused Relaxed Algorithm for Moses," Prague Bulletin of Mathematical Linguistics, 96:pp. 69-78 (2011).

Hopkins, Mark, et al., "Tuning as ranking," Proc. 2011 Conf. on Empirical Methods in Natural Language Processing, ACL, pp. 1352-1362 (Jul. 2011).

Junczys-Dowmunt, Marcin, "Phrasal rank encoding: Exploiting phrase redundancy and translational relations for phrase table compression," Proc. Machine Translation Marathon 2012, The Prague Bulletin of Mathematical Linguistics, vol. 98, pp. 63-74 (2012).

Klementiev, Alexandre, et al., "Toward statistical machine translation without parallel corpora," Proc. 13th Conf. of the European Chapter of the Assoc. for Computational Linguistics pp. 1-11 (Apr. 2012).

Koehn, Philipp, et al., "Experiments in domain adaptation for statistical machine translation," Proc. $2^{nd}$ Workshop on Statistical Machine Translation, StatMT '07, pp. 224-227 (2007).

Koehn, Philipp, et al., "Moses: Open Source Toolkit for Statistical Machine Translation," Proc. 45th Annual Meeting of the Assoc. for Computational Linguistics, Companion Volume Proceedings of the Demo and Poster Sessions, pp. 177-180 (2007).

Koehn, Philipp, et al., "Towards effective use of training data in statistical machine translation," Proc. 7th Workshop on Statistical Machine Translation, WMT '12, pp. 317-321 (2012).

Koehn, Philipp, et al., "Knowledge sources for word-level translation models," Proc. 2001 Conf. on Empirical Methods in Natural Language Processing, pp. 27-35 (2001).

Levenberg, Abby, et al., "Stream-based translation models for statistical machine translation," Human Language Technologies: The 2010 Annual Conf. of the North American Chapter of the Association for Computational Linguistics (HLT-NAACL'10), pp. 394-402 (2010).

Lopez, Adam, "Tera-scale translation models via pattern matching," Proc. 22nd Intern'l Conf. on Computational Linguistics—vol. 1, pp. 505-512 (2008).

Lopez, Adam et al., "Word-based alignment, phrase-based translation: What's the link?" Proc. AMTA, pp. 90-99 (2006).

Nicola, Bertoldi, et al., "Domain adaptation for statistical machine translation with monolingual resources," Proc. 4th Workshop on Statistical Machine Translation, StatMT '09, pp. 182-189, Association for Computational Linguistics (2009).

Och, Franz Josef, "Minimum Error Rate Training in Statistical Machine Translation," In Erhard Hinrichs and Dan Roth, editors, Proc. 41st Annual Meeting of the Association for Computational Linguistics, pp. 160-167 (2003).

Papineni, Kishore, Salim Roukos, ToddWard, and Weijing Zhu, "BLEU: a Method for Automatic Evaluation of Machine Translation," Computational Linguistics, pp. 311-318 (2002).

Pecina, Pavel, "Simple and effective parameter tuning for domain adaptation of statistical machine translation," Coling, pp. 2209-2224 (2012).

Razmara, Majid, et al., "Mixing multiple translation models in statistical machine translation," Proc.50th Annual Meeting of the Assoc. for Computational Linguistics: Long Papers—vol. 1, pp. 940-949 (2012).

Sennrich, Rico, "Perplexity minimization for translation model domain adaptation in statistical machine translation," Proc. 13th Conf. of the European Chapter of the Association for Computational Linguistics (EACL '12), ACL, pp. 539-549 (2012).

Sennrich, Rico, et al., "A multi-domain translation model framework for statistical machine translation," Proc.51st Annual Meeting of the Association for Computational Linguistics, vol. 1: Long Papers, pp. 832-840 (2013).

Sennrich, Rico, "Mixture-modeling with unsupervised clusters for domain adaptation in statistical machine translation," Proc.16th Annual Conf. of the European Association of Machine Translation (EAMT), pp. 185-192 (2012).

(56) References Cited

OTHER PUBLICATIONS

Smith, Jason R., et al, "Dirt cheap web-scale parallel text from the common crawl," Proc. 51st Annual Meeting of the Association for Computational Linguistics (vol. 1: Long Papers), pp. 1374-1383 (2013).

Stolcke, Andreas, "SRILM—an extensible language modeling toolkit," Proc. ICSLP, pp. 1-4 (2002).

Tiedemann, Jörg "Parallel data, tools and interfaces in OPUS," in Nicoletta Calzolari (Conference Chair), et al., editors, Proc. 8th Intern'l Conf. on Language Resources and Evaluation (LREC'12), ELRA, pp. 2214-2218 (2012).

Watanabe, Taro, et al., "Online large-margin training for statistical machine translation," Proc. 2007 Joint Conference on Empirical Methods in Natural Language Processing and Computational Natural Language Learning (EMNLP-CoNLL), pp. 764-773 (2007).

Yang, Yi, et al., "l2, 1-norm regularized discriminative feature selection for unsupervised learning," Proc. 22nd Intern'l Joint Conf. on Artificial Intelligence, vol. 2, pp. 1589-1594 (2011).

Zens, Richard, et al., "Efficient phrase-table representation for machine translation with applications to online MT and speech translation," Proc. NAACL HLT, pp. 492-499 (2007).

\* cited by examiner

RETRIEVAL OF DOMAIN RELEVANT PHRASE TABLES

CROSS REFERENCE TO RELATED PATENTS AND APPLICATIONS

Cross reference is made to copending application Ser. No. 14/252,032, filed Apr. 14, 2014, entitled ESTIMATION OF PARAMETERS FOR MACHINE TRANSLATION WITHOUT IN-DOMAIN PARALLEL DATA, by Prashant Mathur, et al., the disclosure of which is incorporated herein by reference in its entirety.

BACKGROUND

The exemplary embodiment relates to phrase-based statistical machine translation (SMT) and finds particular application in connection with a system and method for generating a phrase table for a target domain where there a lack of parallel data for generating the phrase table for the specific target domain.

Statistical machine translation systems use a translation scoring function for scoring candidate translations of a source language text string, such as a sentence. Parameters of the scoring function are generally trained on a parallel development corpus containing pairs of source and target sentences which are assumed to be a translation of each other, in at least the source to target direction. In a phrase-based system, the parameters serve as weights for features of the candidate translation, some of which are derived from a phrase table. The phrase table stores corpus statistics for a set of biphrases found in a parallel training corpus. These statistics include phrasal and lexical probabilities that represent the probability that a given source phrase (or its constituent words, in the case of lexical probability) in a biphrase is translated to the corresponding target phrase, or vice versa. In addition to translation model features that are based on such phrasal and lexical probabilities, the translation scoring function may also incorporate parameters of a language model, which focuses only on the target side probabilities of the translation, and parameters of a reordering model, which takes into account the extent to which the words of the translation are reordered when compared with the order of the aligned words of the source sentence. For a new source sentence to be translated, the SMT scoring function is used to evaluate candidate translations formed by combining biphrases from the phrase table which cover the source sentence, where each source word is covered by no more than one biphrase. The respective corpus statistics of these biphrases are retrieved from the phrase table and corresponding features of the scoring function are computed based thereon which aggregate the probabilities for each of the biphrases being used. The scoring function features are weighted by the scoring function parameters in a log-linear combination to determine an optimal set of the biphrases, from which a translation is generated.

One problem which arises in machine translation is that the values of the phrase table features, and also the parameters of the translation scoring function, can vary from one domain to another. The overall quality of translation is thus dependent, in part, on how well suited the phrase table is to the domain of interest. Thus, there is considerable interest in generating machine translation systems that are adapted to the particular domain of the text to be translated.

To provide broad coverage, SMT systems are often trained on a large corpus of documents which may not be well suited to the particular domain of interest. For example, generic SMT systems may be trained on the Europarl corpus of government documents which may make it more likely that the word "bank" in English is translated in its financial sense, rather than as the bank of a river, which would be more appropriate for translations in the agricultural science domain. It is therefore often desirable to tailor a machine translation system to a specific domain of interest, which is known as domain adaptation. One approach for tailoring an MT system to a specific domain is to train a domain-adapted multi-model that combines a set of trained phrase tables from various domains. However, this approach requires parallel training data in the domain of interest. In many cases, however, there may be insufficient training data in the specific domain. For example, some source language documents may be made available, but since translations are costly to produce, corresponding target language documents may be unavailable. The approach is also computationally intensive if there is a large library of phrase tables of various domains from which to choose.

Several metrics have been used to compute similarity between domains, such as Cross Entropy (Rico Sennrich, "Perplexity minimization for translation model domain adaptation in statistical machine translation," Proc. 13th Conf. of the European Chapter of the Association for Computational Linguistics (EACL '12), pp. 539-549 (2012), hereinafter, "Sennrich 2012"), but this method requires a parallel in-domain corpus. The metric Source LM perplexity can also be used as a measure to score and rank translation models. The Source LM perplexity measure requires only a mono-lingual corpus for computation of similarity with a source domain. However, it assumes the existence of a library of source language models (LMs).

There remains a need for a system and method for retrieving a subset of phrase tables similar to the domain of interest using only a mono-lingual source corpus which can be used to build a multi-model in a time-efficient manner.

INCORPORATION BY REFERENCE

The following references, the disclosures of which are incorporated herein in their entireties by reference, are mentioned:

Phrase-based machine translation systems are disclosed, for example, in U.S. Pat. Nos. 6,182,026 and 8,543,563; U.S. Pub. Nos. 20040024581; 20040030551; 20060190241; 20070150257; 20080300857; 20070265825, 20110022380; 20110178791; 20110282643; 20110288852; 20110307245; 20120041753; 20120101804; 20120259807; 20120278060; 20130006954; and U.S. application Ser. No. 13/596,470, filed on Aug. 28, 2012, entitled LEXICAL AND PHRASAL FEATURE DOMAIN ADAPTATION IN STATISTICAL MACHINE TRANSLATION, by Vassilina Nikoulina, et al.; and U.S. application Ser. No. 13/740,508, filed Jan. 14, 2013, entitled MULTI-DOMAIN MACHINE TRANSLATION MODEL ADAPTATION by Markos Mylonakis, et al. Language models are described, for example, in U.S. Pub. No. 20120278060. Methods for building libraries of parallel corpora from which phrase tables can be generated are disclosed, for example, in U.S. Pub. Nos. 20080262826 and 20100268527. Methods for evaluating the quality of machine translation are disclosed, for example, in U.S. Pub. Nos. 20050137854 and 20090175545 and U.S. Pat. No. 6,917,936.

BRIEF DESCRIPTION

In accordance with one aspect of the exemplary embodiment, a method for generating a phrase table for a target domain includes receiving a source corpus for a target domain. For each of a set of comparative domain phrase tables, a measure of similarity is computed between the source corpus and the comparative domain phrase table. Based on the computed similarity measures, a subset of the comparative domain phrase tables is identified from the set of comparative domain phrase tables. A phrase table is generated for the target domain, based on the subset of phrase tables.

One or more of the computing of the similarity measures, identifying the subset of the phrase tables, and generating the phrase table may be performed with a computer processor.

In accordance with another aspect, a system for generating a phrase table for a target domain includes a similarity computation component which, for each of a set of comparative domain phrase tables, computes a measure of similarity between an input source corpus and the comparative domain phrase table. A multi-model computation component identifies a subset of the comparative domain phrase tables from the set of comparative domain phrase tables based on the computed similarity measures and generates a phrase table for the target domain based on the subset of phrase tables. A processor implements the similarity computation component and the multi-model computation component.

In accordance with another aspect, a method for generating a phrase table for a target domain includes receiving a source corpus for a target domain. For each of a set of comparative domain phrase tables, a measure of similarity is computed between the source corpus and the comparative domain phrase table. At least a subset of the comparative domain phrase tables from the set of comparative domain phrase tables is combined in a weighted combination, weights for the combination being based on the computed similarity measures.

One or more of the computing of the similarity measures, identifying the subset of the phrase tables, and combining may be performed with a computer processor.

DETAILED DESCRIPTION

Aspects of the exemplary embodiment relate to a computer-implemented system and method for generating a phrase table for use in a machine translation system that is adapted to a particular domain. As an example, a customer may provide only a sample source corpus in the domain of interest (referred to as the target domain). It is also assumed that phrase tables (models) already exist for a set of other domains (referred to herein as comparative domains).

Given a target domain monolingual source corpus s, and a set of phrase tables representing various domains $\{pt_1, pt_2, \ldots, pt_n\}$, the exemplary method may include measuring the similarity between each of these phrase tables and s and then ranking them in order of their similarity. This allows a sub-set of the most relevant phrase tables to be identified, which can be aggregated to form a domain-adapted phrase table. A similarity metric (SIM-PT) is described herein that can be used for computing relevancy of each phrase table efficiently.

A "phrase," as used herein generally refers to one or more words in either the source or target language. Here, each word (or, more properly, a token) includes a sequence of characters drawn from a finite alphabet. The alphabet may include punctuation and numbers as well as letters. Thus for example, the phrase "Smith, III, et al." could be a phrase comprising a sequence of seven tokens.

A "biphrase," as used herein, generally comprises two phrases: a first phrase in the source language and a second phrase in a target language, different from the source language, which is a translation of the first phrase. The phrases may each be contiguous (no gaps between the words) or non-contiguous (containing a gap of one or more words).

A "phrase table" is a data structure which includes a set of such biphrases, which may have been derived from a word-aligned parallel corpus in a respective domain. Each biphrase is associated with a value for each of a set of features. A "multi-model" is a phrase table formed by combining two or more, e.g., several, individual phrase tables of various domains, e.g., in a weighted linear combination.

Figure 1:
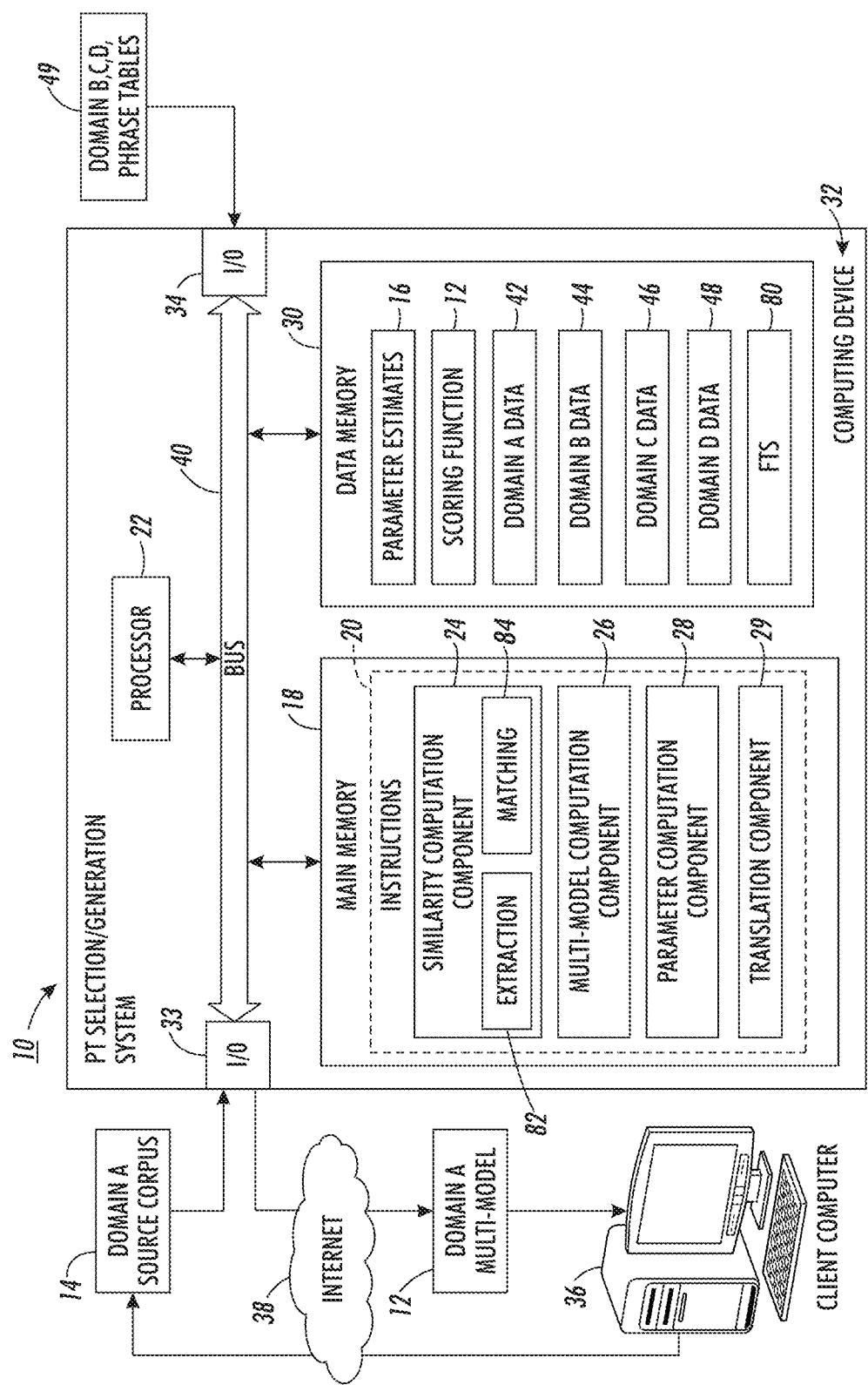
FIG. 1 is a functional block diagram of a system for generating a multi-model phrase table for a target domain.

With reference to FIG. 1, a functional block diagram of a computer-implemented system 10 for selection of phrase tables and for generating a phrase table (multi-model) 12 for a domain-adapted machine translation system is shown.

The exemplary system 10 takes as input a source corpus 14 for the target domain (or n-gram counts derived from a source corpus) and outputs the phrase table 12. The system may also generate parameter estimates 16, e.g., in the form of a vector of weights, which can be used as the parameters $\lambda_m$, of a translation scoring function 17 in the domain-adapted machine translation system.

The system includes main memory 18 which stores instructions 20 for performing the method described below and a processor 22 in communication with the main memory 18 for executing the instructions. The instructions 20 include a similarity computation component 24, a multi-model computation component 26, and optionally a parameter computation component 28 and/or a translation component 29. Data memory 30 stores data used or generated by the software components 24, 26, 28, 29 in the course of the method.

The system 10 may be hosted by one or more computing devices such as a server computer 32. One or more network interfaces 33, 34 allow the system to communicate with external devices, such as a client device 36, which may be operated by a customer seeking to build a machine translation system for a target domain of interest (referred to as domain A). Source corpus 14 (e.g., in the form of a body of text including sentences, optionally in paragraph form, or n-gram counts derived therefrom) may be supplied by the customer to the system 10, e.g., via a wired or wireless link 38, such as a local area network or a wide area network, such as the Internet. Hardware components 18, 22, 30, 33, 34 of the system may be communicatively linked by a data-control bus 40.

Data memory 30 stores domain data 42, 44, 46, 48 for the target domain A and for each of a plurality of comparative domains B, C, D, etc. While three comparative domains are illustrated, it is to be appreciated that data may be provided for any number of comparative domains, such as 2, 3, 4, 5, 6, 8, 10, or more comparative domains, e.g., up to 30 or up to 20 other domains. Some of the data may alternatively be stored on a memory storage device 49 communicatively linked to the system 10.

Figure 2:
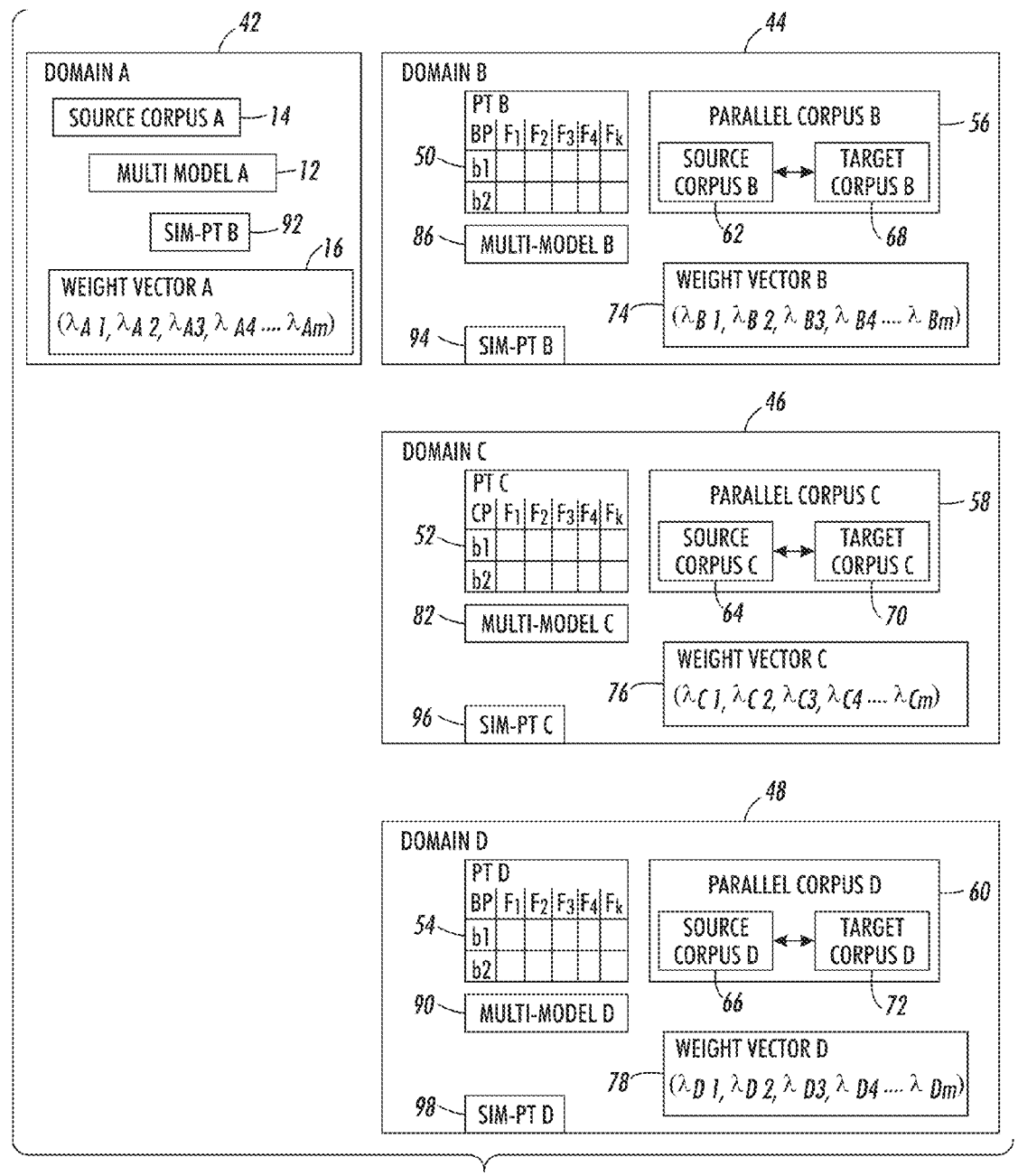
FIG. 2 illustrates data used and generated in the system of FIG. 1.

The domain data 42, 44, 46, 48 is shown in greater detail in FIG. 2. By way of example, for a first comparative domain B, a phrase table 50 includes a set of biphrases b1, b2, etc. (each including a source language phrase and a corresponding target language phrase) and corresponding feature values for features $F_1, F_2, F_3, \ldots F_k$, such as some or all of the features described in further detail below. The source and target languages are the same for comparative domain B as for second and third comparative domains C and D (and the target domain A), but because of different sources of training data, the values of the phrase table features are not identical in all cases, i.e., at least some feature values are different for each phrase table and in some cases, the biphrases included may be different. In general, the biphrases are the ones most frequently occurring in whatever parallel training corpus was previously used to generate the respective phrase table. Domains C and D have respective phrase tables 52, 54. In some embodiments, each comparative domain has an associated parallel corpus 56, 58, 60 (which may be referred to as a development corpus) that includes source and target text strings derived from text in the respective domain that are determined to be translations of each other, in at least the source to target language direction. The development corpus is generally a different (or smaller) corpus from the training corpus which has been used to generate the phrase table, but need not be. Each development corpus 56, 58, 60 includes a respective source corpus 62, 64, 66, comprising the source text, and a target corpus 68, 70, 72 comprising the corresponding target text. Each development corpus 56, 58, 60 can be used to learn an optimal set of parameters 74, 76, 78 for a scoring function for the respective comparative domain, given the respective domain phrase table 50, 52, 54.

The translation scoring function 17 can be used, in combination with the multi-model phrase table 12, for scoring candidate translations of source strings in a target domain (domain A). Given a text string from the target domain which is written in the source natural language, the translation scoring function is used to identify the most probable translation from a set of candidate translations in the target natural language. Each natural language has its own vocabulary and a grammar, such as English and French.

The scoring function 17 may be a log-linear model of the general form shown in Equation (1):

$$\text{score}(t_1 \mid s_1) = \frac{1}{Z} \exp\left(\sum_{m=1}^{M} \lambda_m h_m(s_1, t_1)\right) \quad (1)$$

where each feature $h_m$, scores a particular aspect of the relationship between a source language text string, such as a sentence $s_1$ and a candidate translation $t_1$ in the target language, $\lambda_m$ is the respective parameter (stored in the parameter estimates 16), and Z is an optional normalization constant. See, for example, Christoph Tillmann and Fei Xia, "A Phrase-Based Unigram Model For Statistical Machine Translation," in Proc. HLT-NAACL 2003 Conf., Edmonton, Canada (2003), and Richard Zens and Hermann Ney, "Improvements in Phrase-Based Statistical Machine Translation," Proc. Conf. HLT-NAACL, pp. 257-264 (2004).

Each feature $h_m$ is either an independent feature, or obtained by a linear combination of the features from several component models, as given in Equation (2):

$$h_{pr}(s, t) = \log \sum_{j=1}^{N} \phi_j P_{phr,j}(t \mid s) \quad (2)$$

which computes the inverse phrasal feature based on the corresponding j phrasal features $P_{phr,j}(t\mid s)$ of the j biphrases used in generating the candidate translation and respective weights C.

As an example, features $h_m$ may include translation model features $t_{m1}, t_{m2}, t_{m3}, t_{m4}$, etc., reordering model features $r_{m1}, r_{m2}, r_{m3}, r_{m4}$, etc., and a language model feature lm. See, for example, U.S. Pub. No. 20070150257 for further details on such features. Some of these features are derived from the phrase table 12 for the target domain. For example, translation model features may include forward (direct) and backward (inverse) lexical and phrasal probability features which are each an aggregation of the respective features of the biphrases that are used to form the candidate translation. In the exemplary embodiment, a preexisting phrase table 12 is not available for the target domain and is generated from the phrase tables 50, 52, 54 which have been created for other domains.

In an example embodiment, the total number of features used in the log-linear scoring function 17 is fourteen, as in the MOSES translation system, given by:

1. phrase translation model features (5 features)
   (a) inverse phrase translation probability $\phi(s\mid t)$
   (b) inverse lexical weighting lex(s|t)
   (c) direct phrase translation probability $\phi(t\mid s)$
   (d) direct lexical weighting lex(t|s)
   (e) phrase penalty (always exp(1)=2.718)
2. language model (1 feature)
3. word penalty (1 feature)
4. reordering model features (7 features)

The similarity computation component 24 is configured for computing a measure of similarity between the source corpus 14 of the target domain and a phrase table of a comparative domain B, C, or D by comparing n-grams present in the source corpus 14 with the source language phrases of length n occurring in the biphrases of the respective phrase table 50, 52, 54, etc. An n-gram is a text sequence consisting of n tokens, where n is a fixed number, such as 1, 2, 3, or 4. The similarity computation component 24 may also compute similarity measures between the source corpus of one comparative domain and the phrases tables of other comparative domains in a similar manner, for estimating parameters of the log-linear scoring function 17, according to the method outlined in copending application Ser. No. 14/252,032, filed Apr. 14, 2014, entitled ESTIMATION OF PARAMETERS FOR MACHINE TRANSLATION WITHOUT IN-DOMAIN PARALLEL DATA.

The exemplary similarity measure thus allows a measure of similarity to be made between different domains when there is only a source corpus 14 and no preexisting phrase table for that corpus, as is the case for target domain A.

The similarity measure computed between a source corpus s and a given phrase table pt is referred to as the SIM-PT score, and may be of the form shown in Equation (3):

$$SIM-PT(PT, S) = \left( \prod_{n=p}^{n=q} \frac{\text{match}(n \mid pt, s)}{\text{total}(n \mid s)} \right)^{\frac{1}{r}} \quad (3)$$

where match(n|pt,s) is the count of n-grams of order n in a source corpus s that exist in the source side of a given phrase table pt, total(n|s) is the number of n-grams of order n in the source corpus, $\Pi_{n=p}^{n=q}$ is the product of the values computed for each value of n, p is a first value of n, q is a second value of n higher than p, and r is the total number of values of n used to compute the SIM-PT score.

Specifically, a similarity measure SIM-PT can be computed between the source corpus 14 and each of the comparative domain phase tables 50, 52 and 54, denoted similarity measures Sim A→B, Sim A→C, and Sim A→D, respectively.

The values of n that are selected to compute the SIM-PT score are generally less than or equal to the largest source-side strings found in the phrase tables. For example, p may be 1 or 2 and q may be from 3-10, such as up to 7, e.g., 4. r may be at least 2, such as at least 3 or at least 4. It is also contemplated that some values of n may be omitted. The same values of p, q and r are used in each case. When p is 1 and q is 4, Equation (3) corresponds to Equation (4).

$$SIM-PT(PT, S) = \left( \prod_{n=1}^{4} \frac{\text{match}(n \mid pt, s)}{\text{total}(n \mid s)} \right)^{\frac{1}{4}} \quad (4)$$

To compute match(n|pt,s), the source corpus 14 is effective traversed with a sliding window of size n and for each instance of an n-gram that is present in the source side of the phrase table 50, 52, or 54, the value of match(n|pt,s), is incremented. Thus, for example, in the simplified case when n=2, the source corpus 62 consists solely of "to be or not to be" and the phrase table 52 includes the 2-gram source side phrases "to be" and "not to" in biphrases b1, b2, the count match(n|pt,s) would be 3. Assuming that p is 2 and q is 3 and that the phrase table 52 includes one 3-gram, "or not to", the SIM-PT score would be $$\left( \frac{3}{5} + \frac{1}{4} \right)^{\frac{1}{2}} = 0.85^{\frac{1}{2}} = 0.922$$

since the total number of 2-grams in the source corpus is 5 and the total number of 3-grams in the source corpus is 4. This is only a simplified example, since the source corpus 14 may include at least 50, or at least 100 or at least 1000 n-grams of each size n and each phrase table may include 10,000 or more biphrases, such as up to 1 million biphrases.

In other embodiments, each type of n-gram is counted only once, irrespective of how many times it appears in the source corpus. Thus, in the simplified example above, the count of match(n|pt,s) when n=2 would be 2.

Figure 3:
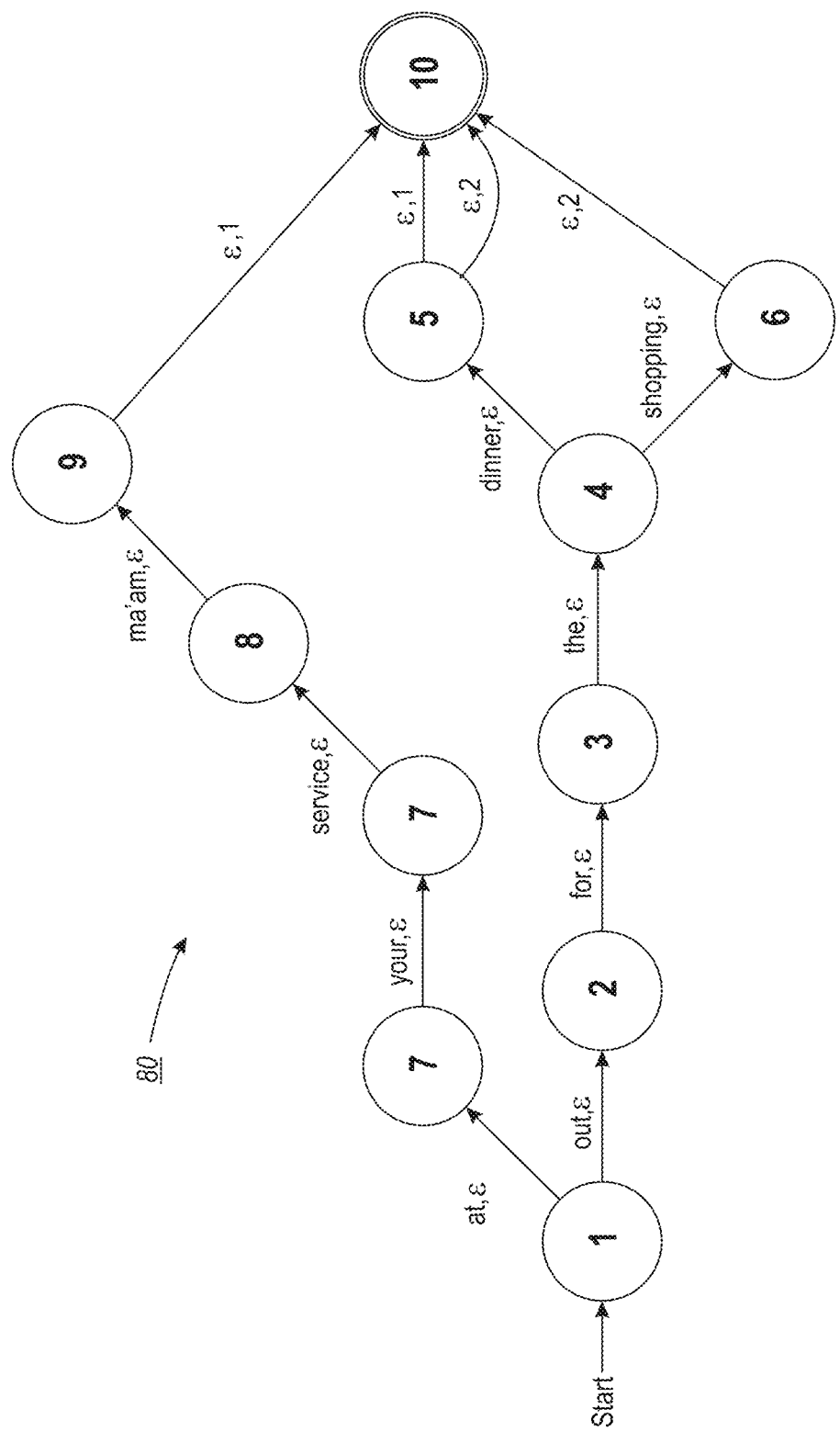
FIG. 3 is a flow chart illustrating a method for generating a multi-model phrase table for a target domain.

In one embodiment, the counts match(n|pt,s) for each of the phrase tables 50, 52, 54 being compared can be computed simultaneously by encoding all of the phrase tables being compared as a single finite state transducer (FST) 80, via weighted finite-state automata (wFSA), as illustrated in FIG. 3. Only a small part of the finite state transducer is illustrated for clarity. In this embodiment, in order to compute match(n|pt,s), the library of phrase tables {$pt_1, pt_2, \ldots, pt_n$} is encoded as a non-deterministic finite state transducer 80 where the input alphabet is the source language vocabulary, and the output alphabet is the indices of the phrase tables. The transducer 80 consumes an input phrase (n-gram) and outputs the indices of all the comparative domain phrase tables where the input phrase occurs. For example, the source corpus may include the n-gram "out for the dinner". Starting with the first word, and with each additional word of the n-gram, the indices of the phrase tables which include that sequence are emitted, until the last word of the n-gram is reached and the indices of the phrase tables that include the entire n-gram are output. In the illustrated case, phrase tables with indices 1 and 2 both include the n-gram "out for the dinner", so their indices are output as the final step (10). In some embodiments, a single finite state transducer (FST) is generated from the set of phrase tables for each value of n.

The number of matches for every phrase table can thus be computed over one pass over the source corpus s in a client-server setup. At each position in the corpus 14, a client extraction component 82 (FIG. 1) computes the set of unigram, bi-gram, tri-gram and 4-gram n-grams (generally, one of each, except near to the end of the corpus text). For example, given a source text 14 of "We are going out for the dinner.", then at position 4, corresponding to the word "out", the four n-grams "out", "out for", "out for the", and "out for the dinner" are extracted. As will be appreciated, this is the case when the SIM-PT is computed as in Eqn. (4). Where different lengths of n-grams are considered, as in Eqn. (3) these may be identified instead. Each of the n-grams extracted is sent as a query to a matching component 84. The matching component, which in one embodiment may be hosted by a remote server, passes the query as input to the transducer 80 and outputs a set of indices of the matching phrase tables. For example, the transducer in FIG. 3 would accept an input phrase "at your service ma'am" and output 1 indicating that this phrase is present only in phrase table 1, while accepting an input phrase "out for the dinner" to return 1 and 2 indicating that this phrase is present in both the phase tables 1 and 2. The value of match(n|pt,s) is incremented by the client 82 for each of the matching phrase tables. The number of matches is then used by the similarity computation component 24 to compute the SIM-PT scores discussed above.

Based on the computed SIM-PT scores, the multi-model computation component 26 identifies a subset of the phrase tables 50, 52, 54, etc. for combining to form a multi-model which is to serve as the phrase table 12. In one embodiment, the phrase tables indices are sorted in descending order of their SIM-PT score. Depending on the size of phrase table library, the most relevant (highest scoring) phrase tables can then be selected for building the multi-model 12. In one embodiment, the multi-model 12 is a linear weighted combination of a plurality of phrase tables, such as three, four, five, or six phrase tables.

The multi-model model computation component 26 generates a multi-model (i.e., a mixture model) of two or more phrase tables by weighting the feature values of the biphrases with mixing coefficients that are based on the computed domain similarity scores. In cases where there are a large number of phrase tables being compared, fewer than all phrase tables may be used to compute a mixture model. For example, the v phrase tables with the highest similarity scores may be used, where v may be, for example, from 3-7, and/or only those phrase tables which exceed a threshold similarity score may be used.

The mixture model computation component 26 may thus compute the multi-model 12 as a weighted linear combination of the respective phrase tables where the weights ($\phi_j$, in Eqn. 2) are a function of the domain similarity scores. In one embodiment, the domain similarity scores are normalized so that all of the scores sum to 1. For, example, if the domain similarity measures, e.g., SIM-PT scores, computed for domain A by comparing the source text 14 with phrase tables 50, 52 and 54 are 0.218, 0.922 and 0.354 respectively, the top two (0.922 and 0.354) may be selected yielding normalized weights of 0.723 and 0.277, which may be applied to the feature values of the biphrases of phrase tables 52, 54, respectively, and the weighted values for each biphrase summed to generate multi-model 12. Thus, the weights give more emphasis in the multi-model to the phrase tables of those comparative domains for which the domain similarity measure is highest. Where a biphrase occurs in fewer than all the comparative domain phrase tables 52, 54 being combined, the feature values may be assumed to be 0 for those phase tables where the biphrase does not occur.

In a similar way, a respective multi-model B 86, may be computed for comparative domain B, based on the phrase tables 52 and 54 of the other comparative domains C and D, and similar multi-models C, D 88, 90 computed for domains C and D.

Given the multi-models 12, 86, 88, 90, a further similarity measure 92, 94, 96, 98 can be computed between the source corpus 14, 62, 64, 66, and the respective multi-model for that domain. These are referred to as multi-model similarity measures and may be computed in the same manner as for the domain similarity measures described above. For example, in the case of target domain A, the multi-model similarity measure may be a SIM-PT score, SIM-PT A 92, which is computed between source corpus 14 and multi-model A 12. Similarly, for comparative domains B, C, and D, etc., respective multi-model similarity measure SIM-PT scores SIM-PT B, SIM-PT C, and SIM-PT D 94, 96, 98 can be computed.

Given the comparative domain parameter vectors 74, 76, and 78 and their corresponding multi-model similarity measures 94, 96, 98, the parameter computation component 28 optionally learns a regression function which relates the multi-model similarity measures and the corresponding weights. Then, given the learned regression function and multi-model similarity measure 92, parameters 16, such as a vector of weights, can be estimated for the target domain, e.g., of the form ($\lambda_{A1}, \lambda_{A2}, \lambda_{A3}, \lambda_{A4}, \ldots \lambda_{Am}$), one weight for each of the m feature functions in the log linear scoring function 17. Each parameter may be estimated independently or a multi-task regression function may be learned which computes a set of parameters jointly.

In some embodiments, the system hosts a translation component 29, such as a phrase-based machine translation system based on MOSES, or the like, which uses the phrase table 12 and optionally the log-linear scoring function 17 incorporating the learned weights 16 for translation of new source text in the target domain (and/or for translation of the source corpus itself). Alternatively, the domain multi-model 12 and optionally the parameters 16 are output to the client device for use in such a translation system.

The computer system 10 may include one or more computing devices 32, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 18, 30, 49 may represent any type of non-transitory computer readable medium such as random access memory (RAM), read only memory (ROM), magnetic disk or tape, optical disk, flash memory, or holographic memory. In one embodiment, the memory 18, 30 comprises a combination of random access memory and read only memory. In some embodiments, the processor 22 and memory 18 may be combined in a single chip. The network interface 33, 34 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 22 can be variously embodied, such as by a single-core processor, a dual-core processor (or more generally by a multiple-core processor), a digital processor and cooperating math coprocessor, a digital controller, or the like. The digital processor 22, in addition to controlling the operation of the computer 32, executes instructions stored in memory 18 for performing the method outlined in FIG. 4. Computing device 36 may be similarly configured with memory and a processor.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 4:
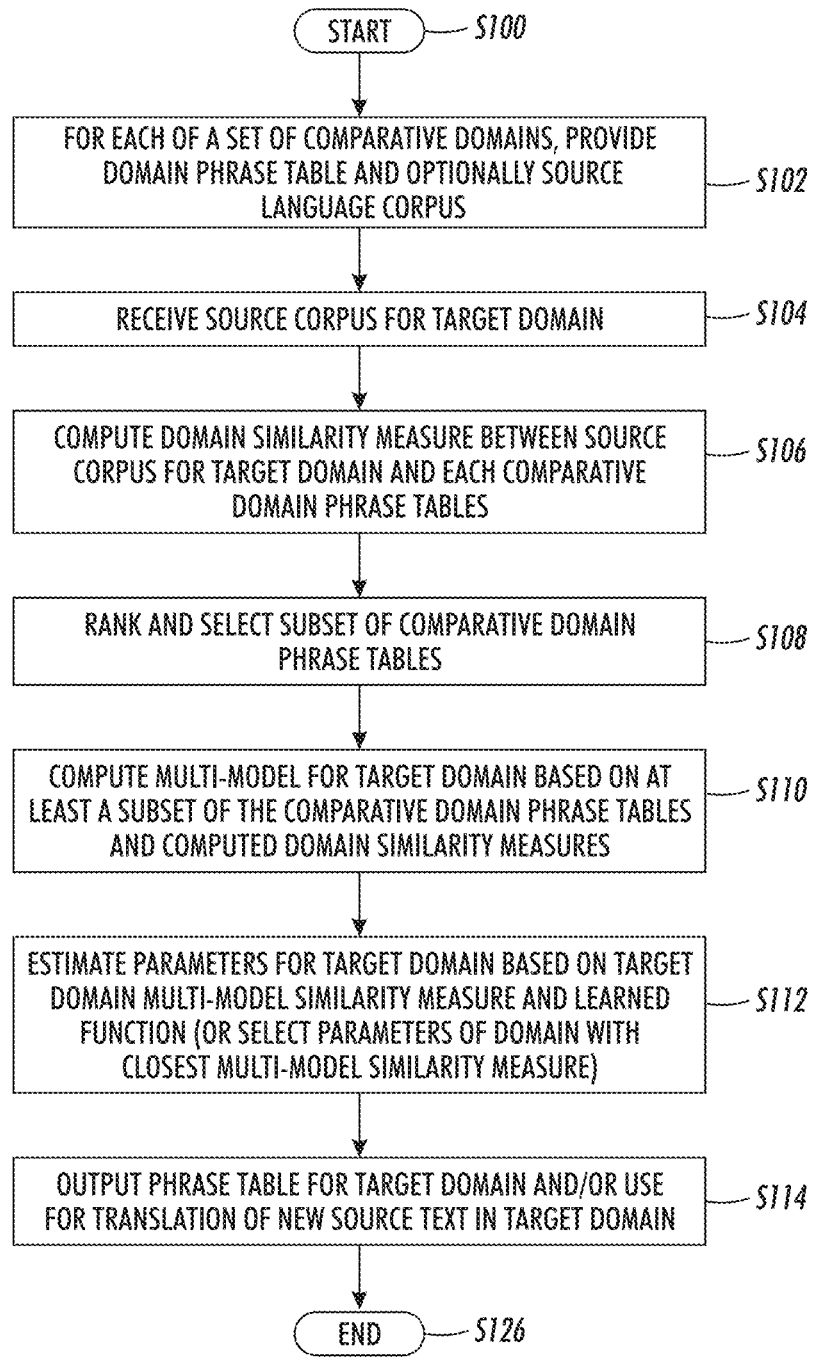
FIG. 4 illustrates a phrase table finite state transducer.

FIG. 4 illustrates a method for selecting out-of-domain phrase tables for building a phrase table 12 for a target domain without the need for a target domain parallel corpus which may be performed with the system of FIG. 1. The method begins at S100.

At S102, a phrase table 50, 52, 54 is provided for each of a set of comparative domains B, C, D, etc., and may be stored in system memory 30.

At S104, a source corpus 14 for target domain A is received by the system and may be stored in memory 30. If the customer considers the source corpus 14 to be confidential, the customer may extract all the n-grams for each of the selected values of n and their frequencies from the source corpus and provide that information instead.

At S106, a domain similarity measure (e.g., score) is computed, by the similarity computation component 24, between the source corpus 14 for the target domain A and each of the comparative domain phrase tables 50, 52, 54.

Optionally, at S108, the comparative domain phrase tables are ranked based on their computed domain similarity scores and a subset of the comparative domain phrase tables (fewer than all) with the highest domain similarity scores is identified.

At S110, a multi-model 12 is computed for the target domain A, by the multi-model computation component 26, by combining at least the subset of the highest ranking comparative domain phrase tables 50, 52. In the combination each of the biphrase features is weighted by a mixing coefficient which is a function of the computed domain similarity measures.

Optionally, at S112, parameters for the target domain translation function 17 are estimated using a regression function which has been learned using source corpora of the comparative domains and respective multi-models, as described in copending application Ser. No. 14/252,032.

At S114, the multi-model 12 for the target domain A (and optionally also the estimated parameters 16) may be output from the system 10 and/or used directly by the translation component 29 for translation of the source corpus 14 or new source text in the target domain. Exemplary phrase-based statistical machine translation systems which may be used for this purpose are well known. See for example, the references incorporated by reference above and P. Koehn, et al., "Moses: Open Source Toolkit for Statistical Machine Translation," Proc. 45th Annual Meeting of the Assoc. for Computational Linguistics, Companion Volume Proceedings of the Demo and Poster Sessions, pp. 177-180 (2007).

The method ends at S116.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 32, (for example, an internal hard drive of RAM), or may be separate (for example, an external hard drive operatively connected with the computer 32), or may be separate and accessed via a digital data network such as a local area network (LAN) or the Internet (for example, as a redundant array of inexpensive of independent disks (RAID) or other network server storage that is indirectly accessed by the computer 32, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4 can be used to implement the method for estimating parameters.

As will be appreciated, while the steps of the method may all be computer implemented, in some embodiments, one or more of the steps may be at least partially performed manually.

As will also be appreciated, the steps of the method need not all proceed in the order illustrated and fewer, more, or different steps may be performed.

The exemplary system 10 and method advantageously makes use of previously trained models (phrase tables) for various comparative domains. Such resources are available from a variety of external sources or a library of models may have been built for other customers. The method makes use of this information to estimate a phrase table 12, and optionally parameters 16 of a translation scoring function, for a new domain for which a parallel development set is not available. In the examples below, it is demonstrated that the method for tuning the parameters of a log-linear model that does not require an in-domain parallel development corpus achieves results that are comparable to parameter estimation on a parallel development corpus using a conventional method such as MIRA (see, Hasler et al., 2011).

The metric, SIM-PT, can be used for efficiently computing similarity between a source corpus and a phrase table. In the case of learning parameters 16, the optimization problem (finding the best weights for a log-linear combination of weight vectors) is reduced to a problem of learning a function that maps the similarity to the parameter estimates.

The exemplary method for selecting comparative domain phrase tables is fast and efficient. The SIM-PT metric can be used to first retrieve the set of relevant comparative domain phrase tables that are most similar to the provided target domain source corpus 14. The training of the multi-model 12 involves computing similarity of the target domain corpus with each of the phrase tables for computing the mixing coefficients, which is computed during the retrieval itself in the exemplary embodiment.

The short time for retrieval of comparative domain relevant phrase tables of particular benefit in cases where the source corpus may be all that needs to be translated. In such a case, the retrieval (along with multi-model training) and the translation are ideally performed quickly, which is achievable with the exemplary method.

The combination of the comparative domain phrase tables can thus occur at translation time, and does not require building a multi-model in advance. In other cases, customers may prefer that the multi-model be shipped to them. In such cases, it can be built in advance. In such a case, the multi-model can be built based on the storage limitations of the customer.

The exemplary method can be employed by a machine translation service which receives requests from various business groups and customers to develop machine translation systems quickly for their domains. Traditionally, this is done by first accumulating domain relevant resources, and then building a domain-adapted model for the appropriate domain. It takes considerable time to customize the system due to the effort it takes in identifying the right resources (corpora) and then training the system with these. In the exemplary method, a library of resources is maintained, and then the relevant models can be retrieved, given the customer needs, and these models used to build the final model 12 that can be delivered to the customer. All these steps can be performed automatically, thus reducing the delivery time considerably.

Without intending to limit the scope of the exemplary embodiment, the following examples demonstrate the applicability of the method.

EXAMPLES

Figure 5:
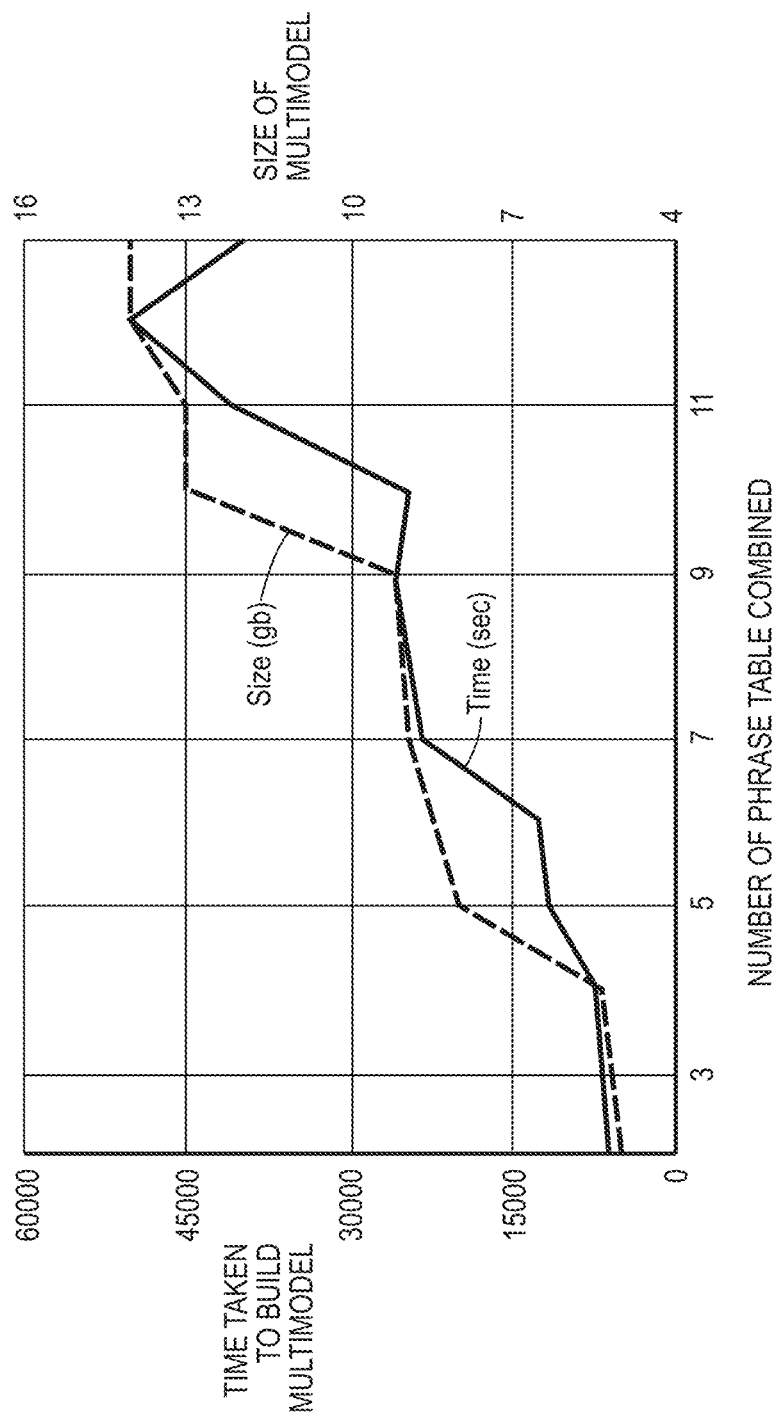
FIG. 5 illustrates size of a multi-model phrase table and time taken to build a multi-model phrase table, given the number of component models (phrase tables)

FIG. 5 plots the time taken to build a multi-model 12 given a number of comparative phrase tables to be combined. It can be seen that as the number of component phrase tables increases, the time and space requirements grow rapidly. For example, it takes 11550 seconds to build a 5-component multi-model, while taking 40740 seconds for an 11-component multi-model. The rise in the memory (number of GB) is also clearly evident. Note that the load on the machine was lower when 13 component phrase tables were combined than when 12 phrase tables were combined, which resulted in the dip in time from 12 to 13 in FIG. 5. This graph demonstrates the advantage of selecting only a subset of the phrase tables for use in computing a multi-model.

Figure 6:
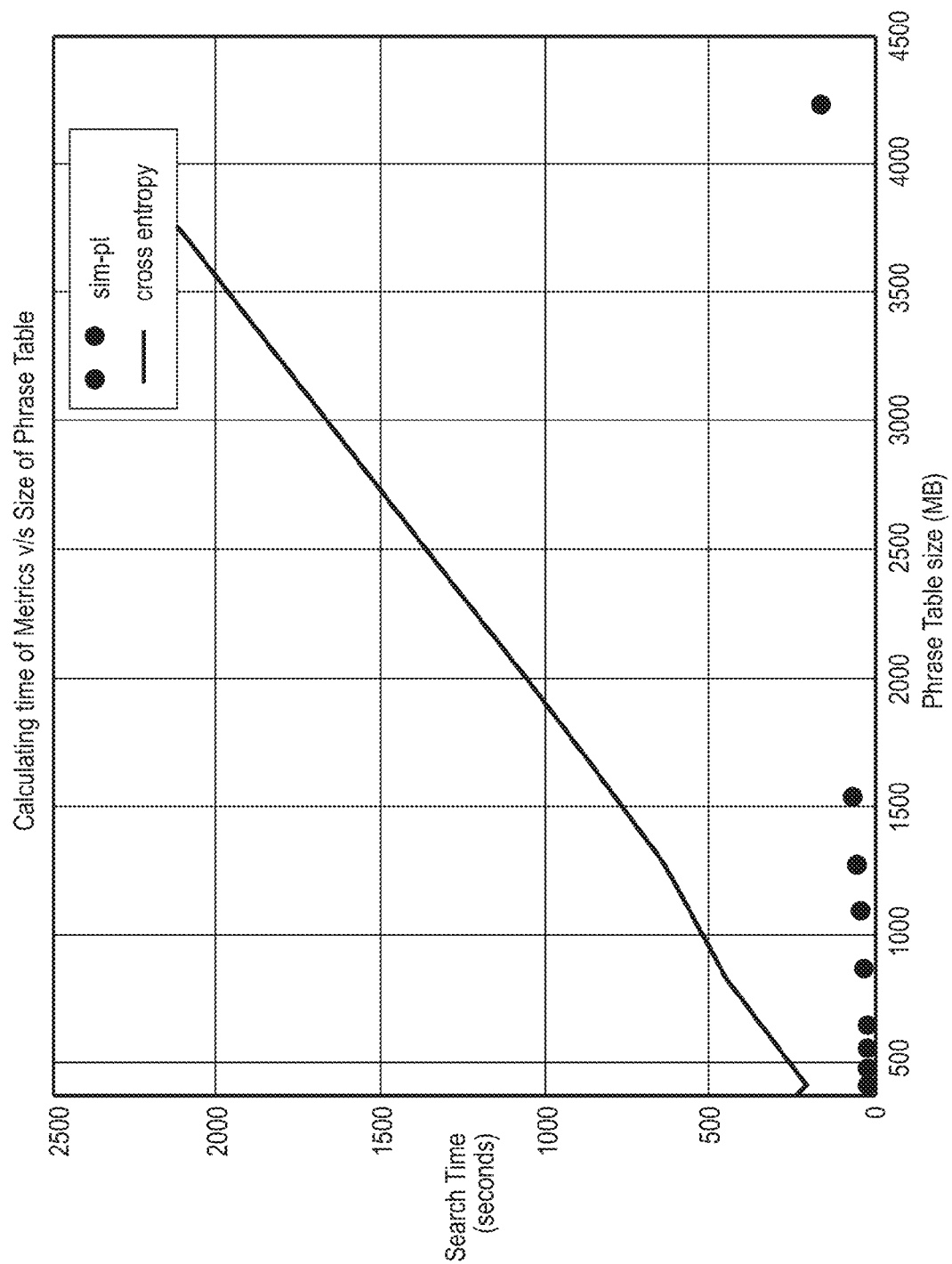
FIG. 6 compares the search time for different sizes of phrase table for the exemplary similarity metric vs a cross entropy metric.

FIG. 6 shows the time taken to compute SIM-PT score using Eqn. (4) and also the time taken to compute Cross-Entropy by the method of Sennrich 2012 to measure similarity of a phrase-table to a domain.

It can be seen that the SIM-PT method is extremely fast when compared to cross-entropy, especially for phrase tables of larger sizes. This result has a significant impact on the time taken to train a multi-model. Cross-entropy is not suited to the example case where a machine translation service has a large collection of phrase tables and the similarity metric needs to be computed on the entire set, although it could be applied on the smaller sub-set of the phrase tables retrieved using the SIM-PT metric. As also noted above, cross-entropy assumes the existence of parallel in-domain corpora, while SIM-PT assumes the availability of only the source corpus.

While computation of SIM-PT using Eqn. (4) is fast (160 seconds) it can be memory intensive (12 GB) while computation of cross-entropy is slow (42 minutes) but uses less memory (49 MB) when combining 12 phrase tables with total size of 4.2 GB. However, another advantage of using SIM-PT apart from fast retrieval is that the phrase tables can be indexed using wFSA-based indexing and the FSTs 80 can be stored in binarized format on disk (the size of a binarized FST is approximately one tenth of the size of the phrase table indexed). When a source corpus is received, the indexed binarized FSTs are loaded and the SIM-PT calculated. This is not feasible for calculating cross entropy because one pass is needed over all the phrase tables in question.

Figure 7:
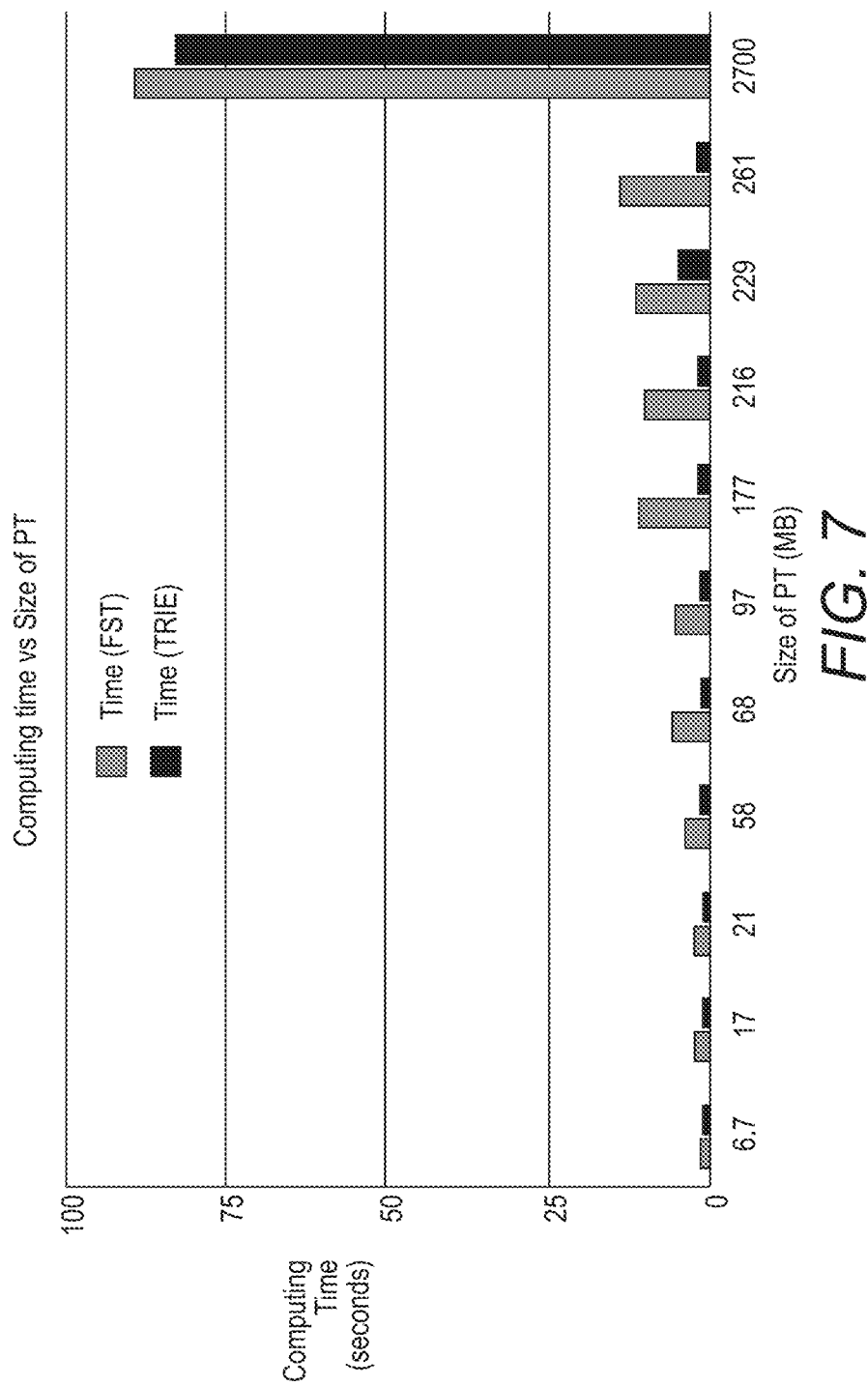
FIGS. 7 and 8 illustrate the computation time and memory requirements for building different sizes of phrase table for the exemplary similarity metric vs a Trie method.
Figure 8:
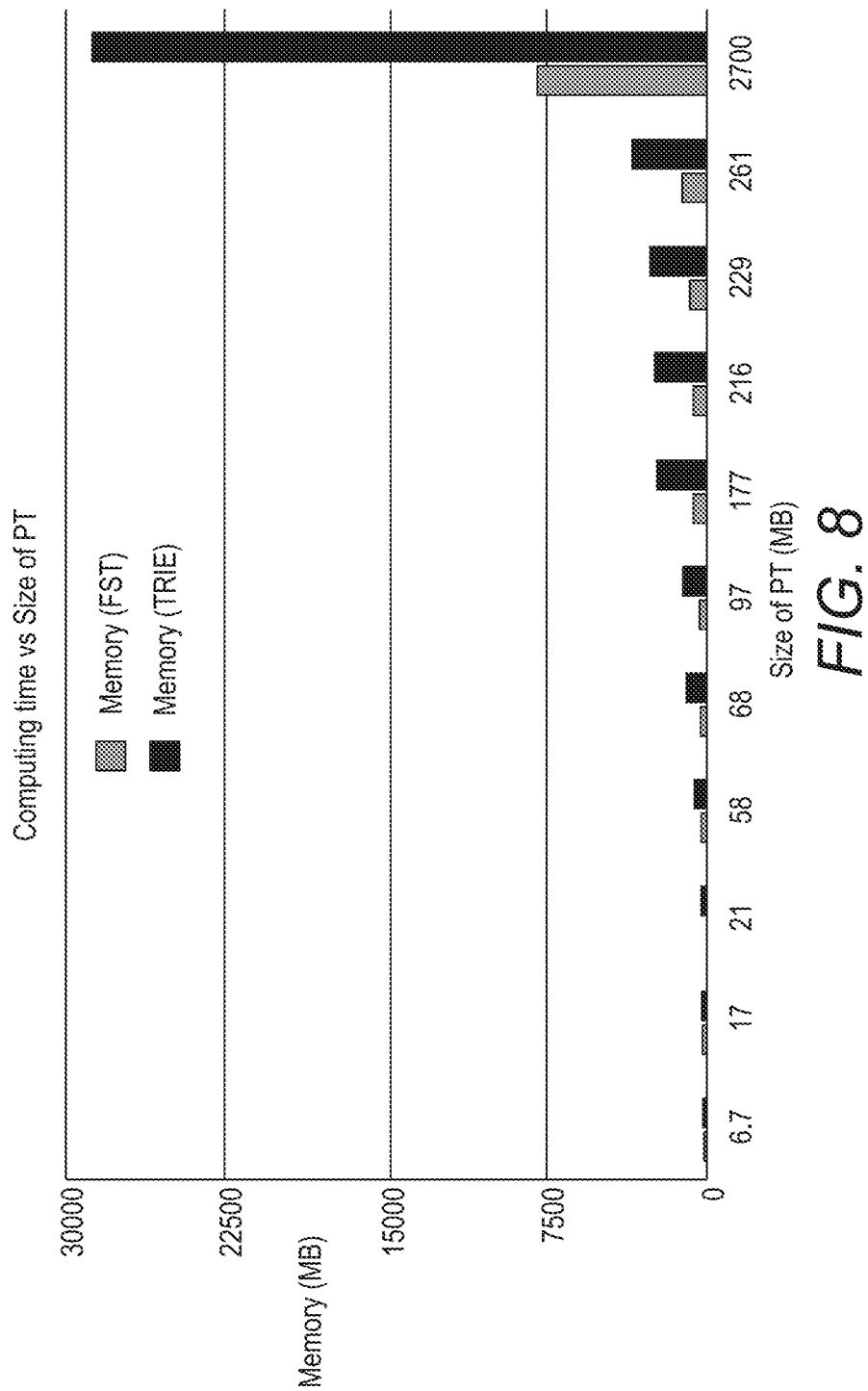

The exemplary method was also compared with a standard approach where a phrase table is encoded as a Trie, which is an adaptation of the approach in Zens and Ney (Richard Zens and Hermann Ney, "Efficient phrase-table representation for machine translation with applications to online MT and speech translation," Proc. NAACL HLT, pp. 492-499 (2007)). For different sizes of phrase table and a common source sample, the computing time and memory requirements for computing mixing coefficients are calculated using the exemplary FST and the Trie method and shown in FIGS. 7 and 8, respectively. Computing time with the FST is somewhat longer but uses much less memory.

For computing the FST, a highly optimized library—OpenFST was used (see, http://www.openfst.org). OpenFST also allows storing the FST in a binarized form on disk, thus, when queried can be loaded very fast. However, there is no optimized library which allows a Trie to be serialized and stored on disk.

The examples demonstrate that efficient retrieval of relevant phrase tables and computation of mixing coefficients for domain adaptation can be achieved given only a sample source corpus. The retrieval of similar models from an entire library can lead to a quicker delivery of domain relevant multi-models.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating a phrase table for a target domain comprising:
   receiving a source corpus for a target domain;
   for each of a set of comparative domain phrase tables, computing a measure of similarity between the source corpus and the comparative domain phrase table, the measure of similarity being computed as a function of counts of n-grams of each of a plurality of sizes in the source corpus that are also present in the respective phrase table;
   based on the computed similarity measures, identifying a subset of the comparative domain phrase tables from the set of comparative domain phrase tables; and
   generating a phrase table for the target domain based on the subset of phrase tables;
   wherein the computing of the similarity measures, identifying the subset of the phrase tables, and generating the phrase table is performed with a computer processor.

2. The method of claim 1, wherein each similarity measure may be computed as a function of $$\left(\prod\nolimits_{n=p}^{n=q} \frac{\text{match}(n \mid pt, s)}{\text{total}(n \mid s)}\right)^{\frac{1}{r}},$$

where match(n|pt,s) is the count of n-grams of order n in the source corpus s that exist in a source side of the respective comparative domain phrase table pt,
total(n|s) is the number of n-grams of order n in the source corpus, and
p is a first value of n, q is a second value of n higher than p, and r is the total number of values of n used in the computation.

3. The method of claim 2, wherein p is 1.
4. The method of claim 2, wherein q is at least 3.
5. The method of claim 2, wherein r is at least 3.
6. The method of claim 2, wherein the similarity (SIM-PT (PT,S) is computed as:

$$SIM-PT(PT, S) = \left(\prod\nolimits_{n=1}^{4} \frac{\text{match}(n \mid pt, s)}{\text{total}(n \mid s)}\right)^{\frac{1}{4}}.$$

7. The method of claim 2, wherein the source corpus includes at least 50 n-grams of each size n.
8. The method of claim 1 wherein the generating of the phrase table for the target domain comprises combining the subset of phrase tables in a weighted combination in which each of the comparative domain phrase tables in the subset is weighted as a function of the measure of similarity between the source corpus for the target domain and the respective comparative domain phrase table.

9. The method of claim 8, further comprising normalizing the similarity measures of the comparative domain phrase tables in the subset of phrase tables, and wherein in the combining of the subset of phrase tables, each of the comparative domain phrase tables in the subset is weighted by the respective normalized similarity measure.

10. The method of claim 1, wherein each of the comparative domain phrase tables includes biphrase features for each of a set of biphrases, each biphrase including a source phrase and a corresponding target phrase, the biphrase features having been derived from a parallel corpus of source and target text strings for the respective comparative domain.

11. The method of claim 10, wherein the generating of the phrase table for the target domain comprises for each of the set of biphrase features of one of the biphrases in the set of biphrases, computing a weighted combination of feature values of each of the subset of phrase tables.

12. The method of claim 10, wherein the biphrase features include features selected from the group consisting of lexical features and phrasal features.

13. The method of claim 1, wherein the method further comprises encoding the set of comparative domain phrase tables as a finite state transducer, the computing a measure of similarity between the source corpus and the comparative domain phrase table comprising inputting a phrase extracted from the source corpus to the finite state transducer and outputting, from the finite state transducer, indices of each of the comparative domain phrases tables which include the phrase.

14. A method, for generating a phrase table for a target domain comprising:
   receiving a source corpus for a target domain;
   for each of a set of comparative domain phrase tables, computing a measure of similarity between the source corpus and the comparative domain phrase table, wherein the computing of the measure of similarity between the source corpus and the comparative domain phrase table comprises computing an occurrence of each of a set of phrases in the source corpus in biphrases of each of the phrase tables;
   based on the computed similarity measures, identifying a subset of the comparative domain phrase tables from the set of comparative domain phrase tables; and
   generating a phrase table for the target domain based on the subset of phrase tables;
   wherein the computing of the similarity measures, identifying the subset of the phrase tables, and generating the phrase table is performed with a computer processor.

15. The method of claim 1, wherein the set of comparative domain phrase tables comprises at least five comparative domain phrase tables The method of claim 1, wherein the method is performed without access to a parallel corpus in the target domain.

16. The method of claim 1, wherein the subset of comparative domain phrase tables comprises at least three comparative domain phrase tables.

17. A computer program product comprising a non-transitory recording medium storing instructions, which when executed on a computer, causes the computer to perform the method of claim 1.

18. A system for generating a phrase table for a target domain comprising memory which stores instructions for performing the method of claim 1 and a processor in communication with the memory for executing the instructions.

19. A system for generating a phrase table for a target domain comprising:
   a similarity computation component which, for each of a set of comparative domain phrase tables, computes a measure of similarity between an input source corpus and the comparative domain phrase table;
   a multi-model computation component which identifies a subset of the comparative domain phrase tables from the set of comparative domain phrase tables based on the computed similarity measures and generates a phrase table for the target domain based on the subset of phrase tables; and
   a processor which implements the similarity computation component and the multi-model computation component.

20. A method for generating a phrase table for a target domain comprising:
   receiving a source corpus for a target domain;
   for each of a set of comparative domain phrase tables, computing a measure of similarity between the source corpus and the comparative domain phrase table;
   combining at least a subset of the comparative domain phrase tables from the set of comparative domain phrase tables in a weighted combination, weights for the combination being based on the computed similarity measures; and
   wherein at least one of the computing of the similarity measures, identifying the subset of the phrase tables, and combining is performed with a computer processor.

* * * * *